(12) United States Patent
Bergenlid et al.

(10) Patent No.: US 12,715,414 B2
(45) Date of Patent: Aug. 25, 2026

(54) METHOD OF OPERATING A COMPRESSED AIR SYSTEM, COMPUTER PROGRAM, COMPUTER-READABLE MEDIUM, CONTROL ARRANGEMENT, COMPRESSED AIR SYSTEM, AND VEHICLE

(71) Applicant: Scania CV AB, Södertälje (SE)

(72) Inventors: Erik Bergenlid, Billeberga (SE); Pawandeep Dhanoa, Skärholmen (SE); Martin Fellke, Stockholm (SE); Richard Hellstrand, Motala (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 18/690,401

(22) PCT Filed: Sep. 2, 2022

(86) PCT No.: PCT/SE2022/050785
§ 371 (c)(1),
(2) Date: Mar. 8, 2024

(87) PCT Pub. No.: WO2023/043354
PCT Pub. Date: Mar. 23, 2023

(65) Prior Publication Data

US 2024/0376911 A1 Nov. 14, 2024

(30) Foreign Application Priority Data

Sep. 15, 2021 (SE) .................................... 2151132-4

(51) Int. Cl.
*B60T 17/00* (2006.01)

(52) U.S. Cl.
CPC .......... *B60T 17/002* (2013.01); *B60T 17/004* (2013.01); *B60T 17/006* (2013.01)

(58) Field of Classification Search
CPC ..... B60T 17/002; B60T 17/004; B60T 17/006
See application file for complete search history.

(56) References Cited

U.S. PATENT DOCUMENTS 6,036,449 A 3/2000 Nishar et al.
9,950,291 B1 * 4/2018 Wright .............. B01D 53/0423
(Continued)

FOREIGN PATENT DOCUMENTS

DE 112015002184 T5 2/2017
EP 3549836 A1 10/2019
(Continued)

OTHER PUBLICATIONS

Scania CV AB, International Patent Application No. PCT/SE2022/050785, International Search Report, Nov. 29, 2022.
(Continued)

*Primary Examiner* — Matthew Wiblin
(74) *Attorney, Agent, or Firm* — Moore & Van Allen PLLC; W. Kevin Ransom

(57) ABSTRACT

A method of operating a compressed air system of a vehicle is disclosed. The compressed air system comprises a purge valve controllable to an open state to vent air from the compressed air system at a location between an air compressor and an air processing element. The method comprises the step of controlling the purge valve to the open state if data is indicative of at least one of a preceding, an ongoing and an upcoming accumulation of matter in at least one component of the compressed air system and maintaining the purge valve in the open state until the air pressure in the compressed air system declines below a threshold pressure. The present disclosure further relates to a computer program, a computer-readable medium, a control arrangement, a compressed air system, and a vehicle.

17 Claims, 2 Drawing Sheets

(56) References Cited

U.S. PATENT DOCUMENTS

| | | | | |
|---|---|---|---|---|
| 2017/0165605 | A1 | 6/2017 | Minato et al. | |
| 2017/0329354 | A1 | 11/2017 | Wright | |
| 2019/0291707 | A1* | 9/2019 | Chun | F15B 21/045 |
| 2020/0263681 | A1 | 8/2020 | Hoff et al. | |
| 2021/0010481 | A1* | 1/2021 | Plow | F04C 18/344 |
| 2021/0046419 | A1* | 2/2021 | Wright | B01D 53/261 |

FOREIGN PATENT DOCUMENTS

| | | | |
|---|---|---|---|
| KR | 102086240 | B1 | 4/2020 |
| WO | 02096732 | A1 | 12/2002 |
| WO | 03013930 | A1 | 2/2003 |

OTHER PUBLICATIONS

Scania CV AB, International Patent Application No. PCT/SE2022/050785, Written Opinion, Nov. 29, 2022.

Scania CV AB, Swedish Patent Application No. 2151132-4, Office Action, Mar. 29, 2022.

Scania CV AB, Swedish Patent Application No. 2151132-4, Office Action, Feb. 17, 2023.

Scania CV AB, International Patent Application No. PCT/SE2022/050785, International Preliminary Report on Patentability, Mar. 5, 2024.

Scania CV AB, European Patent Application No. 22769415.5, Communication pursuant to Article 94(3) EPC, Apr. 17, 2025.

* cited by examiner

METHOD OF OPERATING A COMPRESSED AIR SYSTEM, COMPUTER PROGRAM, COMPUTER-READABLE MEDIUM, CONTROL ARRANGEMENT, COMPRESSED AIR SYSTEM, AND VEHICLE

CROSS-REFERENCE TO RELATED APPLICATIONS

This application is a National Stage Patent Application (filed under 35 § U.S.C. 371) of PCT/SE2022/050785, filed Sep. 2, 2022, of the same title, which, in turn claims priority to Swedish Patent Application No. 2151132-4 filed Sep. 15, 2021, of the same title; the contents of each of which are hereby incorporated by reference.

TECHNICAL FIELD

The present disclosure relates to a method of operating a compressed air system of a vehicle. The present disclosure further relates to a computer program, a computer-readable medium, a control arrangement for operating a compressed air system of a vehicle, a compressed air system for a vehicle, and a vehicle comprising a compressed air system.

BACKGROUND

Compressed air systems, also known as pneumatic systems, can be used in vehicles for powering various systems and arrangements of the vehicle. Examples are brake systems, suspension systems, different types of pneumatic actuators for opening and closing doors, panels, and the like.

Normally, a compressed air system comprises an air compressor and a pressure reservoir wherein the air compressor is configured to compress air to the pressure reservoir. The air compressor is typically operated such that the pressure in the compressed air system is kept within a predetermined pressure range having an upper and a lower pressure limit.

Moreover, in many cases, a compressed air system comprises an air processing unit configured to process air compressed by the air compressor before the air is led to various systems and/or to the pressure reservoir. The air processing unit may comprise one or more air dryer units configured to dry air compressed by the air compressor.

A problem associated with compressed air systems of vehicles is accumulation of matter in components of the compressed air system. As an example, in some conditions, such as during cold ambient temperatures, ice may form in components of the compressed air system, such as in the air compressor and in the air processing unit. The formation of ice may cause malfunctions of the compressed air system and of arrangements/systems powered by the compressed air system.

A known approach to counter this problem is to activate and run the air compressor continuously while the air pressure in the compressed air system is regulated by opening a valve arranged between the air compressor and air processing unit. This valve exhausts the pressure in the supply line to the atmosphere. In this manner, the air compressor can be operated to heat the compressed air system.

However, this approach is associated with some problems and drawbacks. As an example, the approach provides a limited ability to remove accumulated matter from the compressed air system. Moreover, the approach may put strain on components of the compressed air system, especially the air compressor of the compressed air system.

Furthermore, generally, on today's consumer market, it is an advantage if products, such as vehicles and associated components, systems, and arrangements, have conditions and/or characteristics suitable for being manufactured and assembled in a cost-efficient manner.

SUMMARY

It is an object of the present invention to overcome, or at least alleviate, at least some of the above-mentioned problems and drawbacks.

According to a first aspect of the invention, the object is achieved by a method of operating a compressed air system of a vehicle, the compressed air system comprising an air compressor, an air processing element, and an air pressure accumulator. The air compressor is configured to compress air to the air pressure accumulator via the air processing element when an air pressure in the compressed air system is below a threshold pressure. The compressed air system comprises a purge valve controllable to an open state to vent air from the compressed air system at a location between the air compressor and the air processing element. The method comprises the step of:

- controlling the purge valve to the open state if data is indicative of at least one of a preceding, an ongoing and an upcoming accumulation of matter in at least one component of the compressed air system, and
- maintaining the purge valve in the open state until the air pressure in the compressed air system declines below the threshold pressure.

Since the method comprises the step of maintaining the purge valve in the open state until the air pressure in the compressed air system declines below the threshold pressure, a method is provided capable of heating the compressed air system in a simple, efficient, and reliable manner. This is because the air compressor will start to operate when the air pressure in the compressed air system declines below the threshold pressure and the air compressor is thereby triggered to operate in a simple and reliable manner. Moreover, a large volume of air can be filled into the compressed air system by the air compressor because the purge valve has been maintained in the open state to lower the air pressure in the compressed air system below the threshold pressure before the air compressor starts to operate. Thus, due to these features, a method is provided capable of heating the compressed air system and components thereof, such as the air processing element and the air compressor, in an efficient manner.

Moreover, since the purge valve is configured to vent air from a location of the compressed air system between the air compressor and the air processing element, a regeneration of the air processing element can be provided when the purge valve is controlled to, and maintained in, the open state. Thus, in this manner, the method provides conditions for an improved removal of, and/or prevention of, matter in the compressed air system. In addition, the efficient heating of the air processing element provides conditions for an efficient subsequent regeneration of the air processing element which also provides conditions for an improved removal of, and/or prevention of, matter in the compressed air system.

Accordingly, a method is provided overcoming, or at least alleviating, at least some of the above-mentioned problems and drawbacks. As a result, the above-mentioned object is achieved.

Optionally, the data is indicative of a temperature of at least one portion of the compressed air system.

Thereby, the purge valve can be controlled in an accurate manner to the open state to heat the compressed air system in an efficient manner to thereby obtain an efficient and reliable removal of matter, and/or prevention of formation of matter, in the compressed air system.

Optionally, the method comprises the step of:

obtaining the data by sensing the temperature of at least one portion of the compressed air system.

Thereby, accurate data indicative of at least one of a preceding, an ongoing, and an upcoming accumulation of matter is obtained in a simple manner. Thereby, the purge valve can be controlled in an accurate manner to the open state to heat the compressed air system in an efficient manner. As an alternative, or in addition, the data may be obtained in another manner, such as by an estimation/modelling of the data, and/or by obtaining the data from an external device, such as a temperature sensor, a communication device, or the like.

Optionally, the method comprises the step of:

controlling the purge valve to a closed state when the air compressor starts to operate.

Thereby, a method is provided capable of avoiding damage or wear of the air compressor. This is because unrestricted operation, i.e. operation without a significant back pressure at an outlet of the air compressor, is avoided. As a further result thereof, a method is provided offering more freedom in the choice of type of air compressor for the compressed air system. In other words, the method is provided allowing the use of an air compressor being more sensitive to unrestricted operation, such as a rotary compressor, or the like.

Moreover, since the method comprises the step of controlling the purge valve to the closed state when the air compressor starts to operate, a method is provided capable of heating a larger part of the compressed air system in an efficient manner, including the air processing element and components and systems downstream of the air processing element. This is because the air heated by the air compressor is allowed to flow through the air processing element and components and systems downstream of the air processing element in an efficient manner during operation of the air compressor instead of flowing out of the purge valve. As a further result thereof, a method is provided having conditions for an improved removal of, and/or prevention of, matter in a larger part of the compressed air system.

According to a second aspect of the invention, the object is achieved by a computer program comprising instructions which, when the program is executed by a computer, cause the computer to carry out the method according to some embodiments of the present disclosure. Since the computer program comprises instructions which, when the program is executed by a computer, cause the computer to carry out the method according to some embodiments described herein, a computer program is provided which provides conditions for overcoming, or at least alleviating, at least some of the above-mentioned drawbacks. As a result, the above-mentioned object is achieved.

According to a third aspect of the invention, the object is achieved by a computer-readable medium comprising instructions which, when executed by a computer, cause the computer to carry out the method according to some embodiments of the present disclosure. Since the computer-readable medium comprises instructions which, when the program is executed by a computer, cause the computer to carry out the method according to some embodiments described herein, a computer-readable medium is provided which provides conditions for overcoming, or at least alleviating, at least some of the above-mentioned drawbacks. As a result, the above-mentioned object is achieved.

According to a fourth aspect of the invention, the object is achieved by a control arrangement for operating a compressed air system of a vehicle, the compressed air system comprising an air compressor, an air processing element, and an air pressure accumulator. The air compressor is configured to compress air to the air pressure accumulator via the air processing element when an air pressure in the compressed air system is below a threshold pressure. The compressed air system comprises a purge valve controllable to an open state to vent air from the compressed air system at a location between the air compressor and the air processing element. The control arrangement is configured to:

control the purge valve to the open state if data is indicative of at least one of a preceding, an ongoing and an upcoming accumulation of matter in at least one component of the compressed air system, and maintain the purge valve in the open state until the air pressure in the compressed air system declines below the threshold pressure.

Since the control arrangement is configured to maintain the purge valve in the open state until the air pressure in the compressed air system declines below the threshold pressure, a control arrangement is provided capable of heating the compressed air system in a simple, efficient, and reliable manner. This is because the air compressor will start to operate when the air pressure in the compressed air system declines below the threshold pressure and the air compressor is thereby triggered to operate in a simple and reliable manner. Moreover, a large volume of air can be filled into the compressed air system by the air compressor because the purge valve has been maintained in the open state to lower the air pressure in the compressed air system below the threshold pressure before the air compressor starts to operate. Thus, due to these features, a control arrangement is provided capable of heating the compressed air system and components thereof, such as the air processing element and the air compressor, in an efficient manner.

Moreover, since the purge valve is configured to vent air from a location of the compressed air system between the air compressor and the air processing element, a regeneration of the air processing element can be provided when the purge valve is controlled to, and maintained in, the open state. In this manner, the control arrangement provides conditions for an improved removal of, and/or prevention of, matter in the compressed air system. In addition, the efficient heating of the air processing element provides conditions for an efficient subsequent regeneration of the air processing element, which also provides conditions for an improved removal of, and/or prevention of, matter in the compressed air system.

Accordingly, a control arrangement is provided overcoming, or at least alleviating, at least some of the above-mentioned problems and drawbacks. As a result, the above-mentioned object is achieved.

It will be appreciated that the various embodiments described for the method are all combinable with the control arrangement as described herein. That is, the control arrangement according to the fourth aspect of the invention may be configured to perform any one of the method steps of the method according to the first aspect of the invention.

Optionally, the control arrangement is configured to control the purge valve to a closed state when the air compressor starts to operate. Thereby, a control arrangement is provided capable of avoiding damage or wear of the air compressor.

This is because unrestricted operation, i.e. operation without a significant back pressure at an outlet of the air compressor, is avoided. As a further result thereof, a control arrangement is provided offering more freedom in the choice of type of air compressor for the compressed air system. In other words, the method is provided allowing the use of an air compressor being more sensitive to unrestricted operation, such as a rotary compressor, or the like.

Moreover, since the control arrangement is configured to control the purge valve to the closed state when the air compressor starts to operate, a larger part of the compressed air system can be heated in a more efficient manner, including the air processing element and components and systems downstream of the air processing element. This is because the air heated by the air compressor is allowed to flow through the air processing element and components and systems downstream of the air processing element in an efficient manner during operation of the air compressor instead of flowing out of the purge valve. As a further result thereof, a control arrangement is provided having conditions for an improved removal of, and/or prevention of, matter in a larger part of the compressed air system.

According to a fifth aspect of the invention, the object is achieved by a compressed air system for a vehicle. The compressed air system comprising an air compressor, an air processing element, and an air pressure accumulator. The air compressor is configured to compress air to the air pressure accumulator via the air processing element when an air pressure in the compressed air system is below a threshold pressure. The compressed air system comprises a purge valve controllable to an open state to vent air from the compressed air system at a location between the air compressor and the air processing element. The compressed air system comprises a control arrangement configured to:

- control the purge valve to the open state if data is indicative of at least one of a preceding, an ongoing and an upcoming accumulation of matter in at least one component of the compressed air system, and
- maintain the purge valve in the open state until the air pressure in the compressed air system declines below the threshold pressure.

Since the control arrangement of the compressed air system is configured to maintain the purge valve in the open state until the air pressure in the compressed air system declines below the threshold pressure, the compressed air system can be heated in a simple, efficient, and reliable manner. This is because the air compressor will start to operate when the air pressure in the compressed air system declines below the threshold pressure and the air compressor is thereby triggered to operate in a simple and reliable manner. Moreover, a large volume of air can be filled into the compressed air system by the air compressor because the purge valve has been maintained in the open state to lower the air pressure in the compressed air system below the threshold pressure before the air compressor starts to operate. Thus, due to these features, the compressed air system, and components thereof, such as the air processing element and the air compressor, can be heated in an efficient manner.

Moreover, since the purge valve of the compressed air system is configured to vent air from a location of the compressed air system between the air compressor and the air processing element, a regeneration of the air processing element can be provided when the purge valve is controlled to, and maintained in, the open state. In this manner, the control arrangement provides conditions for an improved removal of, and/or prevention of, matter in the compressed air system. In addition, the efficient heating of the air processing element provides conditions for an efficient subsequent regeneration of the air processing element which also provides conditions for an improved removal of, and/or prevention of, matter in the compressed air system.

Accordingly, a compressed air system is provided overcoming, or at least alleviating, at least some of the above-mentioned problems and drawbacks. As a result, the above-mentioned object is achieved.

It will be appreciated that the various embodiments described for the method are all combinable with the control arrangement as described herein. That is, the control arrangement of the compressed air system according to the fifth aspect of the invention may be configured to perform any one of the method steps of the method according to the first aspect of the invention.

Optionally, the compressed air system comprises an air processing unit comprising the air processing element, and wherein the purge valve is arranged on the air processing unit. Thereby, conditions are provided for a compact and efficient compressed air system. Moreover, a compressed air system is provided having conditions and characteristics suitable for being manufactured and assembled in a cost-efficient manner. This is because the purge valve of the air processing unit can be used to lower the air pressure in the compressed air system to allow an efficient heating of the compressed air system and can be used to regenerate the air processing element of the compressed air system.

Optionally, the purge valve is an electronically controlled valve. Thereby, conditions are provided for an accurate and reliable control of the purge valve for an efficient removal of, and/or prevention of, matter in the compressed air system.

Optionally, the compressed air system comprises an electric motor configured to power the air compressor. Thereby, conditions are provided for operating the air compressor without the need for a running internal combustion engine. Thus, a compressed air system is provided capable of obtaining an efficient removal of, and/or prevention of, matter in the compressed air system without the need for a running internal combustion engine.

Optionally, the air compressor is a rotary compressor. Thereby, a compressed air system is provided comprising an efficient and reliable air compressor. Moreover, a compressed air system is provided comprising an air compressor having conditions for generating low noise levels during operation. In this manner, the air compressor can be operated also in the absence of a running combustion engine without significantly increasing the noise levels generated by a vehicle comprising the compressed air system.

A rotary compressor is a positive-displacement compressor in which compression of a fluid is performed by at least one rotor, i.e. one or more rotating working members, such as one or more screws, or the like. A rotary compressor, such as a rotary screw compressor, is sensitive to unrestricted operation, i.e. operation without a significant back pressure at an outlet of the air compressor. One reason for this is that these types of compressors are dependent on a lubrication film on one or more rotors of the air compressor. If the air compressor is operated without a back pressure at the outlet or is operated with too low back pressure at the outlet, there is a risk that the lubricant film is removed from the one or more rotors. If so, the lubricant may be transported out from the air compressor with the air stream via the outlet of the air compressor. As a result thereof, the one or more rotors may become insufficiently lubricated, which can cause wear and/or damage of the one or more rotors.

Moreover, the lubricant transported out from the air compressor may disturb operation of the compressed air system, such as clogging the air processing element or other parts or components of the compressed air system. Furthermore, lubricant transported out from the air compressor may cause a reduction in a drying capacity of the air processing element.

However, as explained above, since the control arrangement of the compressed air system may be configured to control the purge valve to a closed state when the air compressor starts to operate, the air compressor can be operated without risking damage or wear of the air compressor and without risking a subsequent malfunction of the compressed air system.

According to a sixth aspect of the invention, the object is achieved by a vehicle comprising a compressed air system according to some embodiments of the present disclosure. Since the vehicle comprises a compressed air system according to some embodiments, a vehicle is provided having conditions for overcoming, or at least alleviating, at least some of the above-mentioned drawbacks. As a result, the above-mentioned object is achieved.

Optionally, the vehicle comprises an electric propulsion motor configured to provide motive power to the vehicle. Thereby, a vehicle is provided having conditions for an efficient, reliable, and silent operation of the air compressor of the compressed air system also in the absence of a running combustion engine.

Optionally, the vehicle comprises at least one pneumatic actuator configured to use compressed air from the compressed air system as a source of power. Thereby, a vehicle is provided comprising an efficient and reliable compressed air system for powering one or more pneumatic actuators of the vehicle.

Optionally, the at least one pneumatic actuator is configured to move a component of the vehicle between at least two different positions. Thereby, a vehicle is provided comprising an efficient and reliable compressed air system for powering one or more pneumatic actuators configured to move a component of the vehicle.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
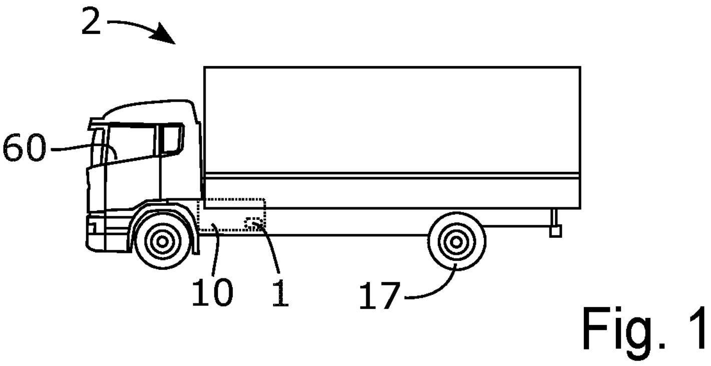
FIG. 1 illustrates a vehicle according to some embodiments.

FIG. 1 illustrates a vehicle 2 according to some embodiments. According to the illustrated embodiments, the vehicle 2 is a truck, i.e. a heavy vehicle. According to further embodiments, the vehicle 2, as referred to herein, may be another type of manned or unmanned vehicle for land or water-based propulsion such as a lorry, a bus, a construction vehicle, a tractor, a car, a boat, a ship, or the like.

The vehicle 2 comprises a powertrain 10. The powertrain 10 is configured to provide motive power to the vehicle 2 via wheels 17 of the vehicle 2, as is further explained herein.

Figure 2:
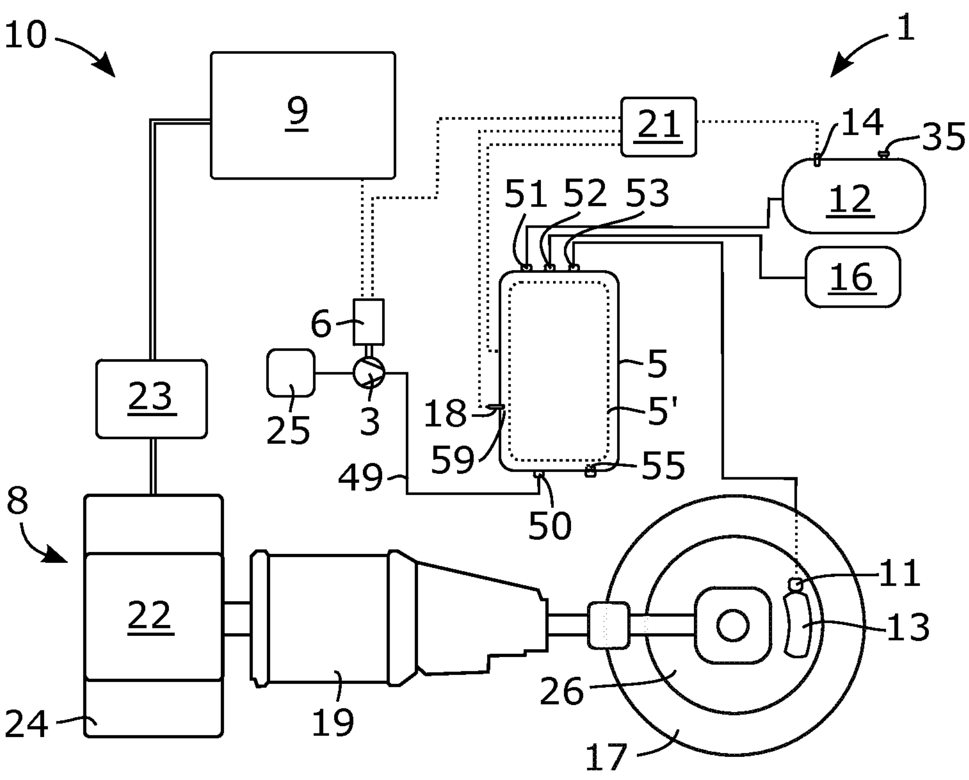
FIG. 2 schematically illustrates a powertrain and a compressed air system of the vehicle illustrated in FIG. 1.

FIG. 2 schematically illustrates the powertrain 10 and a compressed air system 1 of the vehicle 2 illustrated in FIG. 1. Below, simultaneous reference is made to FIG. 1 and FIG. 2, if not indicated otherwise.

According to the illustrated embodiments, the powertrain 10 comprises an electric propulsion motor 8. The electric propulsion motor 8 is configured to provide motive power to the vehicle 2 via wheels 17 of the vehicle 2. The electric propulsion motor 8 may also be referred to as an electric propulsion machine, or the like. According to the illustrated embodiments, the powertrain 10 is a pure electric powertrain and comprise no internal combustion engine. According to further embodiments, the powertrain 10, as referred to herein, may be a so called hybrid electric powertrain comprising an internal combustion engine in addition to the electric propulsion motor 8 for providing motive power to the vehicle 2. Moreover, according to some embodiments of the present disclosure, the powertrain 10 of the vehicle 2, as referred to herein, may comprise an internal combustion engine and may lack an electric propulsion motor.

In FIG. 2, the powertrain 10 is illustrated as comprising one electric propulsion motor 8. However, the powertrain 10 may comprise more than one electric propulsion motor 8. According to the illustrated embodiments, the powertrain 10 comprises a transmission 19. The transmission 19 is configured to transmit power between the electric propulsion motor 8 and one or more wheels 17 of the vehicle 2.

The powertrain 10 comprises a battery 9. According to the illustrated embodiments, the battery 9 is a propulsion battery configured to supply electricity to the electric propulsion motor 8 during operation of the vehicle 2. The battery 9 may comprise a number of battery cells, such as lithium-ion battery cells, lithium polymer batteries cells, or nickel-metal hydride battery cells.

The electric propulsion motor 8 comprises a rotor 22 and a stator 24. The electric propulsion motor 8 is capable of converting electrical energy into mechanical energy in the form of rotation of the rotor 22. Moreover, the electric propulsion motor 8 may be capable of converting mechanical energy in the form of rotation of the rotor 22 into electrical energy which for example can be stored in the battery 9. In this manner the electric propulsion motor 8 may provide regenerative braking of the vehicle 2.

According to the illustrated embodiments, the powertrain 10 comprises a power module 23. The power module 23 is configured to control the amount of electricity supplied from the battery to the electric propulsion motor 8. One of the stator 24 and the rotor 22 may comprise a number of permanent magnets and the other of the stator 24 and the rotor 22 may comprise wire windings. An alternating electric current passed through the wire windings by the power module 23 causes a torque to be applied to the rotor 22 due to the magnetic interaction between the wire windings and the permanent magnets. During operation of the powertrain 10, the electric current passed through the wire windings is alternated in a manner following the rotation of the rotor 22. In this manner, a continuous torque can be applied to the rotor 22 during rotation thereof.

As indicated above, the vehicle 2 comprises a compressed air system 1. The compressed air system 1 comprises an air compressor 3, an air processing element 5', and an air pressure accumulator 12. During operation, the air compressor 3 is configured to compress air to the air pressure accumulator 12 via the air processing element 5'.

According to the illustrated embodiments, the compressed air system 1 comprises an air processing unit 5, wherein the air processing element 5' is comprised in the air processing unit 5. Moreover, according to the illustrated embodiments, the air processing element 5' of the air processing unit 5 is configured to dry, i.e. dehumidify, air compressed by the air compressor 3. The air processing element 5', as referred to herein, may be a replaceable element, such as a replaceable moisture absorbing cartridge, or the like.

According to the illustrated embodiments, the pressure reservoir 12 is a type of pressure accumulator tank configured to hold pressurized air. The pressure reservoir 12 may also be referred to as a pressure tank, a pressure accumulator tank, or the like. The pressure reservoir 12 comprises a pressure relief valve 35. The pressure relief valve 35 is configured to open to the surroundings when the pressure in the pressure reservoir 12 reaches a predetermined pressure. According to the illustrated embodiments, the compressed air system 1 comprises an air filter unit 25, wherein the air compressor 3 is configured to compress/pump air from the air filter unit 25 to the pressure reservoir 12 via the air processing element 5' of the air processing unit 5.

According to the illustrated embodiments, the compressed air system 1 comprises an electric motor 6 configured to power the air compressor 3. In other words, according to the illustrated embodiments, the air compressor 3 is an electrically driven air compressor 3. However, according to further embodiments, the air compressor 3 of the compressed air system 1 may be driven in another manner, such as mechanically, hydraulically, or the like.

The vehicle 2 may comprise at least one pneumatic actuator 11 configured to use compressed air from the compressed air system 1 as a source of power. Moreover, the at least one pneumatic actuator 11 may be configured to move a component 13 of the vehicle 2 between at least two different positions. According to the illustrated embodiments, the vehicle 2 comprises pneumatic brakes 26. In more detail, according to the illustrated embodiments, the vehicle 2 comprises a pneumatic actuator 11 configured to move a component 13 in the form of a brake pad between an engaged position, in which the brake pad brakes rotation of a wheel 17 of the vehicle 2, and a disengaged position, in which the brake pad is moved to a position in which braking of the wheel 17 is cancelled.

As an alternative, or in addition, the vehicle 2 may comprise one or more other types of pneumatic actuators 16 which each may be configured to move one or more other types of components of the vehicle 2 between different positions using compressed air from the compressed air system 1 as a source of power. Purely as examples, such pneumatic actuators 16 may comprise a pneumatic actuator of a suspension system of the vehicle 2, a pneumatic actuator for opening and closing doors, panels, and the like, of the vehicle 2. The pneumatic actuators 11, 16 are arranged downstream of the air processing element 5' of the air processing unit 5. In other words, the air processing element 5' of the air processing unit 5 is configured to process air compressed by the air compressor 3 before the air is led to the pneumatic actuators 11, 16.

According to embodiments herein, the air compressor 3 is configured to compress air to the air pressure accumulator 12 via the air processing element 5' when a current air pressure in the compressed air system 1 is below a threshold pressure. In other words, the air compressor 3 is configured to start to operate when the air pressure in the compressed air system 1 is below the threshold pressure. The threshold pressure, as referred to herein may also be referred to as a first threshold pressure. Moreover, the air compressor 3 may be configured to cancel compression of air, i.e. to cancel operation, when the air pressure in the compressed air system 1 is above a second threshold pressure. In this manner, the air pressure in the compressed air system 1 can be kept within a predetermined pressure range. The second threshold pressure, i.e. the upper limit of the predetermined pressure range may be lower than the predetermined pressure at which the pressure relief valve 35 is configured to open.

The air compressor 3 may comprise a control arrangement being configured to activate operation of the air compressor 3, for example when the air pressure at an outlet of the air compressor 3 falls below the threshold pressure. According to further embodiments, the air compressor 3 may be activated by another type of system, device, or arrangement when the air pressure in the compressed air system 1 is below the threshold pressure, as is further explained herein.

The compressed air system 1 further comprises a purge valve 55. According to the illustrated embodiments, the purge valve 55 is an electronically controlled valve. The purge valve 55 is controllable between an open state and a closed state. The purge valve 55 is configured to vent air from the compressed air system 1 to the surroundings when being controlled to the open state. Moreover, the purge valve 55 is configured to vent air from the compressed air system 1 at a location between the air compressor 3 and the air processing element 5'.

According to the illustrated embodiments, the purge valve 55 is arranged at a location between the air compressor 3 and the air processing element 5' as seen relative to an airflow direction from the air compressor 3 through the air processing element 5'. According to further embodiments, the purge valve 55 may be fluidly connected to a portion of the compressed air system 1, for example via a duct, conduit, or the like, wherein the portion is located between the air compressor 3 and the air processing element 5'. Such a portion may for example be a portion of a supply conduit 49 between the air compressor 3 and the air processing element 5'.

Moreover, as seen in FIG. 2, according to the illustrated embodiments, the purge valve 55 is arranged on the air processing unit 5 at a position upstream of the air processing element 5' as seen relative to an airflow direction from the air compressor 3 through the air processing element 5'. However, as indicated above, the compressed air system 1 may comprise a purge valve arranged at another position/location of the compressed air system, such as at a supply line 49 of the compressed air system 1 arranged between the air compressor 3 and the air processing unit 5

The feature that purge valve 55 is configured to vent air from the compressed air system 1 at a location between the air compressor 3 and the air processing element 5' means that compressed air from the pressure reservoir 12 will flow backwards through the air processing element 5' of the air processing unit 5 and out from the compressed air system 1 via the purge valve 55 when there is an air pressure inside the pressure reservoir 12 above atmospheric pressure and the purge valve 55 is controlled to the open state. In other words, when there is an air pressure inside the pressure reservoir 12 higher than atmospheric pressure and the purge valve 55 is controlled to the open state, compressed air from the pressure reservoir 12 will flow through the air processing element 5' in a direction opposite to the flow direction of air obtained when the air compressor 3 is compressing/pumping air through the air processing element 5'. In this manner, the air processing element 5' is regenerated and matter, such as water and moisture, is removed from the air processing element 5' in an efficient manner. Since the purge valve 55 is kept open until the until the air pressure in the compressed air system 1 declines below the threshold pressure, an extended regeneration is provided in which a large portion of the compressed air in the pressure reservoir 12 is conducted through the air processing element 5. By regenerating the air processing element 5', the service life of the air processing element 5', and the available time before a replacement of the air processing element 5' is needed, can be significantly increased.

The compressed air system 1 comprises a control arrangement 21 configured to operate at least part of the compressed air system 1. The control arrangement 21 is operably connected to the purge valve 55. According to embodiments herein, the control arrangement 21 is configured to control the purge valve 55 to the open state if data is indicative of at least one of a preceding, an ongoing and an upcoming accumulation of matter in at least one component 3, 5, 5' of the compressed air system 1. Moreover, the control arrangement 21 is configured to maintain the purge valve 55 in the open state until the air pressure in the compressed air system 1 declines below the threshold pressure.

Since the control arrangement 21 of the compressed air system 1 is configured to maintain the purge valve 55 in the open state until the air pressure in the compressed air system 1 declines below the threshold pressure, the compressed air system 1 can be heated in a simple, efficient, and reliable manner. This is because the air compressor 3 will start to operate when the air pressure in the compressed air system 1 declines below the threshold pressure and the air compressor 3 is thereby triggered to operate. Moreover, a large volume of air can be filled into the compressed air system 1 by the air compressor 3 because the purge valve 55 has been maintained in the open state to lower the air pressure in the compressed air system 1 below the threshold pressure before the air compressor 3 starts to operate. Thus, due to these features, the compressed air system 1, and components thereof, such as the air processing element 55 and the air compressor 3, can be heated in an efficient manner.

Moreover, since the purge valve 55 of the compressed air system 1 is configured to vent air from a location of the compressed air system 1 between the air compressor 3 and the air processing element 5', a regeneration of the air processing element 5' can be provided when the purge valve 55 is controlled to, and maintained in, the open state. In this manner, the control arrangement 21 provides conditions for an improved removal of, and/or prevention of, matter in the compressed air system 1. In addition, the efficient heating of the air processing element 5' provides conditions for an efficient subsequent regeneration of the air processing element 5' which also provides conditions for an improved removal of, and/or prevention of, matter in the compressed air system, as is further explained herein.

The preceding, ongoing, and/or upcoming accumulation of matter in the at least one component 3, 5, 5' may for example comprise formation of ice in a component of the compressed air system 1, such as in the air processing unit 5, the air processing element 5' or in another part or component of the compressed air system 1. As another example, the preceding, ongoing and/or upcoming accumulation of matter in the at least one component 3, 5, 5' may for example comprise formation of water in the air compressor 3 of the compressed air system 1 or in another part or component of the compressed air system 1.

According to some embodiments, the control arrangement 21 is configured to obtain the data by sensing the temperature of at least one portion 59 of the compressed air system 1. In other words, the data may be indicative of a temperature of at least one portion 59 of the compressed air system 1. In more detail, according to the illustrated embodiments, the compressed air system 1 comprises a temperature sensor 18 configured to sense a current temperature of a portion 59 of the compressed air system 1, wherein the control arrangement 21 is operably connected to the temperature sensor 18 and is configured to obtain the data therefrom. In this manner, the control arrangement 21 can obtain data indicative of at least one of a preceding, an ongoing, and an upcoming accumulation of matter in the at least one component 3, 5, 5' in a simple, efficient, and reliable manner. According to the illustrated embodiments, the portion 59 of the compressed air system 1 is a portion of the air processing unit 5. However, according to further embodiments, the temperature sensor 18 may be configured to sense the temperature of another portion of the compressed air system 1, another portion of the powertrain 10, and/or another portion of the vehicle 2 comprising the compressed air system 1.

Furthermore, according to some embodiments, the control arrangement 21 may obtain data indicative of at least one of a preceding, an ongoing, and an upcoming accumulation of matter in the at least one component 3, 5, 5' from another type of device than a temperature sensor. As an example, the control arrangement 21 may obtain the data from an external device, such as an external sender. The obtained data may be indicative of a current or upcoming ambient temperature, an estimated current or upcoming ambient temperature, or the like, which also can give an indication of the temperature of at least one portion of the compressed air system 1. As a further alternative, or in addition, the data may be obtained by estimating or modelling the data. The data may be estimated/modelled using input such as calendar data, position data, historic accumulation data, historic data of temperatures, and the like.

According to some embodiments, the control arrangement 21 is configured to control the purge valve 55 to a closed state when the air compressor 3 starts to operate. In this manner, damage and/or wear of the air compressor 3 can be avoided. This is because unrestricted operation, i.e. operation without a significant back pressure at an outlet of the air compressor 3, is avoided. As a further result thereof, more freedom is provided in the choice of type of air compressor 3 for the compressed air system 1. In other words, an air compressor being more sensitive to unrestricted operation can be used, such as a rotary compressor, or the like.

Moreover, since the control arrangement 21 is configured to control the purge valve 55 to the closed state when the air compressor 3 starts to operate, a larger part of the compressed air system 1 can be heated in a more efficient manner, including the air processing element 5' and components 11, 12, 16 and systems downstream of the air processing element 5'. This is because the air heated by the air compressor 3 is allowed to flow through the air processing element 5' and components 11, 12, 16 and systems downstream of the air processing element 5' in an efficient manner during operation of the air compressor 3 instead of flowing out of the purge valve 55. As a further result thereof, a control arrangement 21 is provided having conditions for an improved removal of, and/or prevention of, matter in a larger part of the compressed air system 1.

According to some embodiments, the air compressor 3 is a rotary compressor, such as a rotary screw compressor. A rotary compressor is a positive-displacement compressor in which compression of a fluid is performed by at least one rotor, i.e. one or more rotating working members, such as one or more screws, or the like. A rotary compressor lacks a reciprocating piston, connecting rod, and crank mechanism of a reciprocating compressor.

A rotary compressor is an efficient means of compressing air. Furthermore, a rotary compressor is normally able to generate less noise and vibration during operating than a reciprocating compressor. In addition, a rotary compressor normally has a less varying, i.e. more constant, driving torque than a reciprocating compressor making it more suitable to be powered by an electric motor than a reciprocating compressor.

However, a rotary compressor, such as a rotary screw compressor, is more sensitive to unrestricted operation, i.e. operation without significant back pressure at an outlet of the air compressor 3 as compared to a reciprocating compressor. One reason is that rotary compressors are dependent on a lubrication film on one or more rotors. If the air compressor is operated without a back pressure at the outlet or is operated with too low back pressure at the outlet, there is a risk that the lubricant film is removed from the one or more rotors. If so, the lubricant may be transported out from the air compressor 3 together with the air stream via the outlet of the air compressor 3. As a result thereof, the one or more rotors may become insufficiently lubricated, which can cause wear and/or damage of the one or more rotors. Moreover, lubricant transported out from the air compressor 3 may cause a malfunction of the compressed air system 1, for example by clogging components of the compressed air system 1, such as the air processing element 5' or other parts or components of the compressed air system 1. Furthermore, lubricant transported out from the air compressor 3 may cause a reduction in a drying capacity of the air processing element 5'.

However, as explained above, since the control arrangement 21 may be configured to control the purge valve 55 to the closed state when the air compressor 3 starts to operate, a back pressure can be provided for the air compressor 3 during operation thereof. Thus, due to the features of the compressed air system 1, the air compressor 3 can be operated without risking damage or wear of the air compressor 3 and without risking a subsequent malfunction of the compressed air system 1 also in embodiments in which the air compressor 3 is a rotary compressor, such as a rotary screw compressor.

Moreover, in embodiments in which the air compressor 3 is a rotary compressor and in which the vehicle 2 comprising the compressed air system 1 is an at least partially electrically driven vehicle 2, the air compressor 3 can be powered in an efficient, reliable, and silent manner, for example using electricity from a battery 9 of the vehicle 2, also in the absence of a running internal combustion engine.

As mentioned above, the efficient heating of the air processing element 5' provides conditions for an efficient subsequent regeneration of the air processing element 5'. That is, according to some embodiments of the herein described, the control arrangement 21 is configured to perform a number of consecutive regeneration events by controlling the purge valve 55 and maintain the purge valve 55 in the open state until the air pressure in the compressed air system 1 declines below the threshold pressure. When the air pressure in the compressed air system 1 declines below the threshold pressure and the air compressor 3 starts to operate, the control arrangement 21 may control the purge valve 55 to the closed state. Moreover, when the air compressor 3 has increased the air pressure in the compressed air system 1 to a certain level, for example to the second threshold pressure mentioned above, the control arrangement 21 may initiate a second regeneration event. The second regeneration event may comprise a control of the purge valve 55 to the open state followed by a control of the purge valve 55 to the closed state. The control of the purge valve 55 to the closed state may be performed when the air compressor 3 starts to operate, i.e. when the air pressure in the compressed air system 1 declines below the threshold pressure. Since the air processing element 5' is heated in an efficient manner by the compression of air into the compressed air system 1 with a closed purge valve 55, the regenerating efficiency is significantly increased in the second regeneration event and water and moisture in the air processing element 5' can be removed in an efficient manner.

As seen in FIG. 2, according to the illustrated embodiments, the compressed air system 1 comprises a pressure sensor 14 configured to sense a current air pressure in the compressed air system 1. According to the illustrated embodiments, the pressure sensor 14 is arranged in the pressure reservoir 12 and is thus configured to sense a current pressure in the pressure reservoir 12. According to further embodiments, the pressure sensor 14 may be arranged at a different portion of the compressed air system 1. According to the illustrated embodiments, the control arrangement 21 is operably connected to the pressure sensor 14 and is configured to receive pressure data therefrom. Moreover, the control arrangement 21 may be configured to activate operation of the air compressor 3 when the sensed current air pressure in the compressed air system 1 falls below the threshold pressure. Furthermore, the control arrangement 21 may be configured to deactivate operation of the air compressor 3 when the sensed current air pressure in the compressed air system 1 rises above a second threshold pressure. In this manner, the control arrangement 21 may utilize data from the pressure sensor 14 in the control of the electric motor 3 to obtain a pressure in the compressed air system 1 within a predetermined pressure range. The second threshold pressure, i.e. the upper limit of the predetermined pressure range, may be lower than the predetermined pressure at which the pressure relief valve 35 is configured to open. The control arrangement 21 may ensure that the air compressor 3 does not operate when the purge valve 55 is in the open state by deactivating the air compressor 3. The air compressor 3 may be deactivated when the purge valve 55 is controlled to the open state. Likewise, the air compressor 3 may be activated when the purge valve 55 is controlled to the closed state.

According to the illustrated embodiments, the supply line 49 is connected to an inlet port 50 of the air processing unit 5. Moreover, as seen in FIG. 2, the air processing unit 5 comprises a number of outlet ports 51-53. In the illustrated example embodiments, one outlet port 51 is fluidly connected to the pressure reservoir 12 and two outlet ports 52, 53 are each fluidly connected to a respective pneumatic actuator 11, 16. Moreover, as seen in FIG. 2, according to the illustrated embodiments, the purge valve 55 is arranged on the air processing unit 5 and form part of an outlet port thereof. Due to these features, a compact compressed air system 1 is provided having conditions and characteristics suitable for being manufactured and assembled in a cost-efficient manner.

Figure 3:
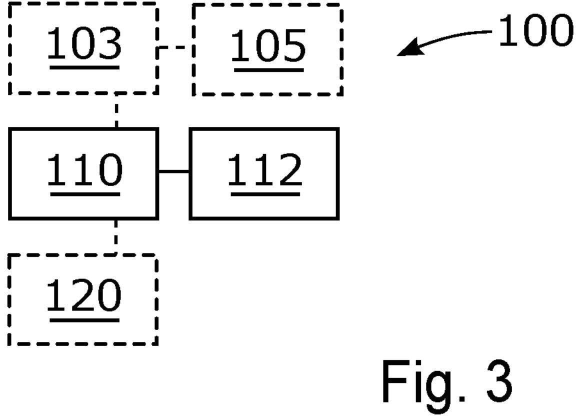
FIG. 3 illustrates a method of operating a compressed air system of a vehicle.

FIG. 3 illustrates a method 100 of operating a compressed air system of a vehicle. The compressed air system may be a compressed air system 1 according to the embodiments illustrated in FIG. 2. Moreover, the vehicle may be a vehicle

2 according to the embodiments illustrated in FIG. 1. Therefore, below, simultaneous reference is made to FIG. 1-FIG. 3, if not indicated otherwise. The method 100 is a method of operating a compressed air system 1 of a vehicle 2, the compressed air system 1 comprising an air compressor 3, an air processing element 5', and an air pressure accumulator 12. The air compressor 3 is configured to compress air to the air pressure accumulator 12 via the air processing element 5' when an air pressure in the compressed air system 1 is below a threshold pressure. The compressed air system 1 comprises a purge valve 55 controllable to an open state to vent air from the compressed air system 1 at a location between the air compressor 3 and the air processing element 5'. The method 100 comprises the step of:

controlling 110 the purge valve 55 to the open state if data is indicative of at least one of a preceding, an ongoing and an upcoming accumulation of matter in at least one component 3, 5, 5' of the compressed air system 1, and maintaining 112 the purge valve 55 in the open state until the air pressure in the compressed air system 1 declines below the threshold pressure.

As illustrated in FIG. 3, the method may comprise the step of:

obtaining 103 data indicative of at least one of a preceding, an ongoing, and an upcoming accumulation of matter in at least one component 3, 5, 5' of the compressed air system 1.

The step of obtaining 103 the data is preferably performed prior to, or simultaneously as, the step of controlling 110 the purge valve 55 to the open state. The step of obtaining 103 the data may comprise a step of retrieving the data from a device of the compressed air system 1 or from an external device or system. As an alternative, or in addition, the step of obtaining 103 the data may comprise a step of estimating or modelling the data. According to some embodiments, the data is indicative of a temperature of at least one portion 59 of the compressed air system 1.

As illustrated in FIG. 3, the method 100 may comprise the step of:

obtaining 105 the data by sensing the temperature of at least one portion 59 of the compressed air system 1.

Moreover, as illustrated in FIG. 3, the method 100 may comprise the step of:

controlling 120 the purge valve 55 to a closed state when the air compressor 3 starts to operate.

It will be appreciated that the various embodiments described for the method 100 are all combinable with the control arrangement 21 as described herein. That is, the control arrangement 21 may be configured to perform any one of the method steps 103, 105, 110, 112, and 120 of the method 100.

Figure 4:
FIG. 4 illustrates computer-readable medium.

FIG. 4 illustrates computer-readable medium 200 comprising instructions which, when executed by a computer, cause the computer to carry out the method 100 according to some embodiments.

According to some embodiments, the computer-readable medium 200 comprises a computer program comprising instructions which, when the program is executed by a computer, cause the computer to carry out the method 100 according to some embodiments.

The control arrangement 21, as referred to herein, may be comprised in the vehicle 2 and may be connected to one or more components of the vehicle 2, such as one or more components of the powertrain 10 of the vehicle 2, and/or one or more components of the compressed air system 1 of the vehicle 2, in order to perform the method 100 illustrated in FIG. 3. One skilled in the art will appreciate that the method 100 of operating a compressed air system 1 of a vehicle 2 may be implemented by programmed instructions. These programmed instructions are typically constituted by a computer program, which, when it is executed in the control arrangement 21, ensures that the control arrangement 21 carries out the desired control, such as the method steps 103, 105, 110, 112, and 120 described herein. The computer program is usually part of a computer program product 200 which comprises a suitable digital storage medium on which the computer program is stored.

The control arrangement 21 may comprise a calculation unit which may take the form of substantially any suitable type of processor circuit or microcomputer, e.g. a circuit for digital signal processing (digital signal processor, DSP), a Central Processing Unit (CPU), a processing unit, a processing circuit, a processor, an Application Specific Integrated Circuit (ASIC), a microprocessor, or other processing logic that may interpret and execute instructions. The herein utilised expression “calculation unit” may represent a processing circuitry comprising a plurality of processing circuits, such as, e.g., any, some or all of the ones mentioned above.

The control arrangement 21 may further comprise a memory unit, wherein the calculation unit may be connected to the memory unit, which may provide the calculation unit with, for example, stored program code and/or stored data which the calculation unit may need to enable it to do calculations. The calculation unit may also be adapted to store partial or final results of calculations in the memory unit. The memory unit may comprise a physical device utilised to store data or programs, i.e., sequences of instructions, on a temporary or permanent basis. According to some embodiments, the memory unit may comprise integrated circuits comprising silicon-based transistors. The memory unit may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

The control arrangement 21 is connected to components of the compressed air system 1 and/or the vehicle 2 for receiving and/or sending input and output signals. These input and output signals may comprise waveforms, pulses, or other attributes which the input signal receiving devices can detect as information and which can be converted to signals processable by the control arrangement 21. These signals may then be supplied to the calculation unit. One or more output signal sending devices may be arranged to convert calculation results from the calculation unit to output signals for conveying to other parts of the vehicle's control system and/or the component or components for which the signals are intended. Each of the connections to the respective components of the compressed air system 1 and/or the vehicle 2 for receiving and sending input and output signals may take the form of one or more from among a cable, a data bus, e.g. a CAN (controller area network) bus, a MOST (media orientated systems transport) bus or some other bus configuration, or a wireless connection.

In the embodiments illustrated, the vehicle 2 comprises a control arrangement 21 but might alternatively be implemented wholly or partly in two or more control arrangements or two or more control units.

Control systems in modern vehicles generally comprise a communication bus system consisting of one or more communication buses for connecting a number of electronic control units (ECUs), or controllers, to various components on board the vehicle. Such a control system may comprise a large number of control units and taking care of a specific function may be shared between two or more of them. Vehicles of the type here concerned are therefore often provided with significantly more control arrangements than depicted in FIG. 2, as one skilled in the art will surely appreciate.

The computer program product 200 may be provided for instance in the form of a data carrier carrying computer program code for performing at least some of the method steps 103, 105, 110, 112, and 120 according to some embodiments when being loaded into one or more calculation units of the control arrangement 21. The data carrier may be, e.g. a CD ROM disc, as is illustrated in FIG. 4, or a ROM (read-only memory), a PROM (programable read-only memory), an EPROM (erasable PROM), a flash memory, an EEPROM (electrically erasable PROM), a hard disc, a memory stick, an optical storage device, a magnetic storage device or any other appropriate medium such as a disk or tape that may hold machine readable data in a non-transitory manner. The computer program product may furthermore be provided as computer program code on a server and may be downloaded to the control arrangement 21 remotely, e.g., over an Internet or an intranet connection, or via other wired or wireless communication systems.

The compressed air system 1, as referred to herein, may also be referred to as a pneumatic system.

The wording upstream and downstream, as used herein, relates to the relative positions of objects in relation to an intended flow direction of fluid in the system or circuit referred to. As an example, the feature that a first object is arranged upstream of a second object in a circuit means that the first object is arranged before the second object seen relative to the intended flow direction of fluid through the circuit. As another example, the feature that a first object is arranged downstream of a second object in a circuit means that the first object is arranged after the second object seen relative to the intended flow direction of fluid through the circuit.

It is to be understood that the foregoing is illustrative of various example embodiments and that the invention is defined only by the appended independent claims. A person skilled in the art will realize that the example embodiments may be modified, and that different features of the example embodiments may be combined to create embodiments other than those described herein, without departing from the scope of the present invention, as defined by the appended independent claims.

As used herein, the term "comprising" or "comprises" is open-ended, and includes one or more stated features, elements, steps, components, or functions but does not preclude the presence or addition of one or more other features, elements, steps, components, functions, or groups thereof.

The invention claimed is:

1. A method of operating a compressed air system of a vehicle, the compressed air system comprising:

an air compressor;

an air processing element; and an air pressure accumulator, wherein the air compressor is configured to operate to compress air in the air pressure accumulator via the air processing element based on a cycle of operation, whereby the air compressor is configured to: (i) automatically start to operate when an air pressure in the compressed air system is below a first lower threshold pressure, (ii) automatically cancel operation when the air pressure in the compressed air system exceeds a second higher threshold pressure, and (iii) not operate after step (ii) has completed, while the air pressure in the compressed air system remains between the first lower and second higher threshold pressures, and wherein the compressed air system comprises a purge valve controllable to an open state to vent air from the compressed air system at a location between the air compressor and the air processing element, wherein the method performs a regeneration event by:

controlling the purge valve to the open state if data is indicative of at least one of a preceding, an ongoing and an upcoming accumulation of matter in at least one component of the compressed air system and the air compressor is not operating due to the air pressure in the compressed air system being between the first lower and second higher threshold pressures;

maintaining the purge valve in the open state until the air pressure in the compressed air system declines below the first lower threshold pressure, where the air compressor will be triggered to automatically operate; and controlling the purge valve to a closed state when the air pressure in the compressed air system declines below the first lower threshold pressure at or before the air compressor starts to operate.

2. The method according to claim 1, wherein the data is indicative of a temperature of at least one portion of the compressed air system.

3. The method according to claim 1 further comprising: obtaining the data by sensing a temperature of at least one portion of the compressed air system.

4. The method according to claim 1 further comprising deactivating the air compressor from operating while the purge valve is in the open state.

5. The method according to claim 1 further comprising automatically activating the compressor if both the purge valve is in the closed state and the air pressure in the compressed air system is below the first lower threshold pressure.

6. The method according to claim 1, wherein the compressor is structured to allow air heated by the air compressor to flow through the air processing element, at least one of a pneumatic actuator and the air pressure accumulator.

7. The method according to claim 1, wherein the the control arrangement is configured to perform a plurality of consecutive regeneration events to thereby purge accumulation of matter in at least one component of the compressed air system.

8. The method according to claim 1, wherein the the control arrangement is configured to ensure that the air compressor does not operate when the purge valve is in the open state by deactivating the air compressor and reactivating the air compressor so that it may operate when the purge valve is controlled to the closed state.

9. A computer program product comprising computer program code stored on a non-transitory computer-readable medium, said computer program product used for operating a compressed air system of a vehicle, the compressed air system comprising: an air compressor; an air processing element; and an air pressure accumulator, wherein the air compressor is configured to operate to compress air in the air pressure accumulator via the air processing element based on a cycle of operation, whereby the air compressor is configured to: (i) automatically start to operate when an air pressure in the compressed air system is below a first lower threshold pressure, (ii) automatically cancel operation when the air pressure in the compressed air system exceeds a second higher threshold pressure, and (iii) not operate after step (ii) has completed, while the air pressure in the compressed air system remains between the first lower and second higher threshold pressures, and wherein the compressed air system comprises a purge valve controllable to an open state to vent air from the compressed air system at a location between the air compressor and the air processing element, said computer program code comprising computer instructions to cause a computer to perform a regeneration event via the following operations:

controlling the purge valve to the open state if data is indicative of at least one of a preceding, an ongoing and an upcoming accumulation of matter in at least one component of the compressed air system and the air compressor is not operating due to the air pressure in the compressed air system being between the first lower and second higher threshold pressures;

maintaining the purge valve in the open state until the air pressure in the compressed air system declines below the first lower threshold pressure, where the air compressor will be triggered to automatically operate; and controlling the purge valve to a closed state when the air pressure in the compressed air system declines below the first lower threshold pressure at or before the air compressor starts to operate.

10. A control arrangement for operating a compressed air system of a vehicle, the compressed air system comprising:

an air compressor;

an air processing element; and an air pressure accumulator, wherein the air compressor is configured to operate to compress air in the air pressure accumulator via the air processing element based on a cycle of operation, whereby the air compressor is configured to: (i) automatically start to operate when an air pressure in the compressed air system is below a first lower threshold pressure, (ii) automatically cancel operation when the air pressure in the compressed air system exceeds a second higher threshold pressure, and (iii) not operate after step (ii) has completed, while the air pressure in the compressed air system remains between the first lower and second higher threshold pressures, and wherein the compressed air system comprises a purge valve controllable to an open state to vent air from the compressed air system at a location between the air compressor and the air processing element, wherein the control arrangement is configured to perform a regeneration event comprising:

controlling the purge valve to the open state if data is indicative of at least one of a preceding, an ongoing and an upcoming accumulation of matter in at least one component of the compressed air system and the air compressor is not operating due to the air pressure in the compressed air system being between the first lower and second higher threshold pressures;

maintaining the purge valve in the open state until the air pressure in the compressed air system declines below the first lower threshold pressure, where the air compressor will be triggered to automatically operate; and controlling the purge valve to a closed state when the air pressure in the compressed air system declines below the first lower threshold pressure at or before the air compressor starts to operate.

11. A compressed air system for a vehicle, the compressed air system comprising:

an air compressor;

an air processing element;

an air pressure accumulator, wherein the air compressor is configured to operate to compress air in the air pressure accumulator via the air processing element based on a cycle of operation, whereby the air compressor is configured to: (i) automatically start to operate when an air pressure in the compressed air system is below a first lower threshold pressure, (ii) automatically cancel operation when the air pressure in the compressed air system exceeds a second higher threshold pressure, and (iii) not operate after step (ii) has completed, while the air pressure in the compressed air system remains between the first lower and second higher threshold pressures, and wherein the compressed air system comprises a purge valve controllable to an open state to vent air from the compressed air system at a location between the air compressor and the air processing element; and a control arrangement configured to perform a regeneration event by:

controlling the purge valve to the open state if data is indicative of at least one of a preceding, an ongoing and an upcoming accumulation of matter in at least one component of the compressed air system and the air compressor is not operating due to the air pressure in the compressed air system being between the first lower and second higher threshold pressures;

maintaining the purge valve in the open state until the air pressure in the compressed air system declines below the first lower threshold pressure, where the air compressor will be triggered to automatically operate; and controlling the purge valve to a closed state when the air pressure in the compressed air system declines below the first lower threshold pressure at or before the air compressor starts to operate.

12. The compressed air system according to claim 11, wherein the compressed air system comprises an air processing unit comprising the air processing element, and wherein the purge valve is arranged on the air processing unit.

13. The compressed air system according to claim 11, wherein the purge valve is an electronically controlled valve.

14. The compressed air system according to claim 11, wherein the compressed air system comprises an electric motor configured to power the air compressor.

15. The compressed air system according to claim 11, wherein the air compressor is a rotary compressor.

16. A vehicle comprising a compressed air system for a vehicle, the compressed air system comprising:

an air compressor;

an air processing element;

an air pressure accumulator, wherein the air compressor is configured to operate to compress air in the air pressure accumulator via the air processing element based on a cycle of operation, whereby the air compressor is configured to: (i) automatically start to operate when an air pressure in the compressed air system is below a first lower threshold pressure, (ii) automatically cancel operation when the air pressure in the compressed air system exceeds a second higher threshold pressure, and (iii) not operate after step (ii) has completed, while the air pressure in the compressed air system remains between the first lower and second higher threshold pressures, and wherein the compressed air system comprises a purge valve controllable to an open state to vent air from the compressed air system at a location between the air compressor and the air processing element; and a control arrangement configured to perform regeneration event by:

controlling the purge valve to the open state if data is indicative of at least one of a preceding, an ongoing and an upcoming accumulation of matter in at least one component of the compressed air system and the air compressor is not operating due to the air pressure in the compressed air system being between the first lower and second higher threshold pressures;

maintaining the purge valve in the open state until the air pressure in the compressed air system declines below the first lower threshold pressure, where the air compressor will be triggered to automatically operate; and controlling the purge valve to a closed state when the air pressure in the compressed air system declines below the first lower threshold pressure at or before the air compressor starts to operate.

17. The vehicle according to claim 16, wherein the vehicle comprises an electric propulsion motor configured to provide motive power to the vehicle.

* * * * *